United States Patent [19]

Borchardt

[11] 4,051,032
[45] Sept. 27, 1977

[54] WATER TREATMENT SYSTEM

[75] Inventor: Jack A. Borchardt, Ann Arbor, Mich.

[73] Assignee: Environmental Filtration Products, Inc., Orlando, Fla.

[21] Appl. No.: 688,558

[22] Filed: May 21, 1976

[51] Int. Cl.² .............................................. B01D 23/24
[52] U.S. Cl. ................................... 210/142; 210/277; 210/283
[58] Field of Search ............... 210/108, 142, 275, 277, 210/278, 279, 283, 284, 287, 290, 80, 81, 82, 102, 141, 266

[56] References Cited

U.S. PATENT DOCUMENTS

| 225,014 | 3/1880 | Lendner | 210/283 |
| 399,957 | 3/1889 | Wilbur | 210/283 |
| 1,499,600 | 7/1924 | Smith | 210/284 |
| 1,745,421 | 2/1930 | Higgins | 210/287 |
| 3,111,486 | 11/1963 | Soriente | 210/108 |
| 3,382,983 | 5/1968 | Stewart | 210/290 |

*Primary Examiner*—Wilbur L. Bascomb, Jr.
*Assistant Examiner*—Ivars Cintins
*Attorney, Agent, or Firm*—Krass & Young

[57] ABSTRACT

A water and wastewater treatment apparatus including a tank divided into a horizontal series of filtering sub-chambers by parallel, perforated septa. Effluent flows through the septa and through a reverse-graded media series including at least one fine medium such as sand. The media may be backwashed by counterflow and right angle flow, the latter being effective to expand and scrub one or more of the layers of media.

16 Claims, 7 Drawing Figures

WATER TREATMENT SYSTEM

INTRODUCTION

The invention relates to either the water treatment or waste treatment systems of the filter type and particularly to the construction and operation of a compact, economical and unitary system for a filtration process contained in a closed chamber having serial filtering subchambers separated by perforated septa.

BACKGROUND OF THE INVENTION

There presently exists a significant need for a practical and economical means for treating both water and waste-water by means of filters. Typical prior art filtration generally involves vertical filtering through media such as sand and gravel. The grading and vertical distribution of said media varies according to the distribution of sizes such that when backwashed vertically the media expands upwardly but then settles back into place in a stratified or graded arrangement. This places the finest of the sand particles at the top of the filter column and the coarsest media at the bottom. Such a vertical filter column is easily plugged up because the fine sand in the topmost layers is the easiest layer to clog and is exposed to the heaviest burden of impurities. Plugging would be minimized if a course to fine grading could be used to permit removal of some of the larger suspended particles ahead of the fine sand layers. There is no way, given that specific gravities of the media layers are constant, for a backwash arrangement to deposit the coarser media on top of the finer media.

In addition, when backwash water does emerge from the surface of a sand bed into a larger void, there results a rapid deceleration of the effluent. This rapid deceleration can result in an immediate loss of sufficient velocity to deposit the heavier dirt particles with the result that these materials tend to accumulate on top of the filtering column such that plugging is enhanced and periodic maintenance is required.

BRIEF SUMMARY OF THE INVENTION

It is a principal objective of the present invention to provide a compact, economical, maintenance-free, yet effective water or wastewater treatment system of the filter type which may be substantially completely factory-built, quickly installed, easily maintained and further which substantially eliminates the problems enumerated above and associated with conventional vertically-graded filter columns using media of uniform specific gravity.

In general, the objectives of the present invention are accomplished by providing a closed chamber having a plurality of substantially vertically-oriented perforated septa disposed therein, such chamber having an inlet at one end and an outlet at the laterally opposite end to provide a serial and substantially horizontal flow-path through the perforated septa and through the filtering medium contained between the septa. Moreover, the invention provides for a counterflow backwash through at least some of the septa to cleanse annd clear accumulated waste materials therefrom, such flow terminating in such a fashion as to maintain backwash velocities and completely and entirely clear the system of large, heavy suspended solids accumulations.

By virtue of the substantially horizontal flow and separation of media layers, the preferred result of reverse grading, or any selected grading of media, can be easily achieved without the need for high structural strength septa and without shifting specific gravities or compromising on desired media size or gradation.

According to a more specific aspect of an illustrated and preferred embodiment of the invention, hereinafter defined in greater detail, the chamer is elevated at the outlet end so as to permit gravity to assist part of the backwash operation while at the same time minimizing the need for such structural strength in the septa as would be needed in vertically graded systems to support the filter media.

In accordance with a still further feature of the illustrated embodiment, the chamber is elevated at the outlet end but the septa are installed within the chamber in parallel but non-vertical orientation so as to be brought into a vertical plane when the chamber is properly inclined; as hereinafter set forth, the suggested angle of inclination is approximately 22°; however, substantial variation is possible. The resulting vertical orientation of the septa still further minimizes the need for structural strength in the septa since the filtering media imposes very little lateral loading. Moreover, the angulation of the septa within the chamber increases the filtering surface area of the septa for a given tank size and hence tends to maximize the filter rating of the system without an accompanying increase in the size and weight of the tank. Conversely, angulation permits the builder to realize the same rating but with a smaller tank.

A further feature of the specific and preferred embodiment of the invention is the provision of means to produce a partial media backwash at right angles to the effluent flowpath, i.e., a vertical backwash. As hereinafter described in greater detail, the vertical backwash of the fine filter medium may be carried out in combination with or in sequence with a substantially horizontal or serial backwash thereby to cleanse and scrub the fine filtering medium while also producing a counterflow which is sufficient to clear the perforated septa and any larger filtering media which might be employed.

Another specific aspect of the invention includes means for producing a partial media backwash in a counterflow direction for the purpose of clearing course filter media. In the preferred embodiment, this is achieved by arranging conduit between the coarse and fine media to supply backwash water at high flow rates, the outlets from the conduit being located to direct water through only the course media.

The invention, as well as the means for putting it into effect, may be best understood from a reading of the following specification which describes a preferred embodiment of the invention in detail. This preferred embodiment incorporates additional features above and beyond those briefly described above including specific structure for the filtering chamber and septa as well as programming system for controlling the sequence of operation of the various valves and pumps which were required to carry out the objectives of the invention. It is to be understood that the specific embodiment is disclosed principally for purposes of illustration and that various modifications and alterations to the embodiment will be apparent to those skilled in the art.

BRIEF DESCRIPTION OF THE DRAWINGS

FIG. 4 is a detail of a floor brace which is also used as a backwash water distributor;

FIG. 6 is a detail of a septum bracing arrangement; and

FIG. 7 is a detail of a composite septum made up of aluminum plates.

DETAILED DESCRIPTION OF SPECIFIC EMBODIMENTS

Figure 1:
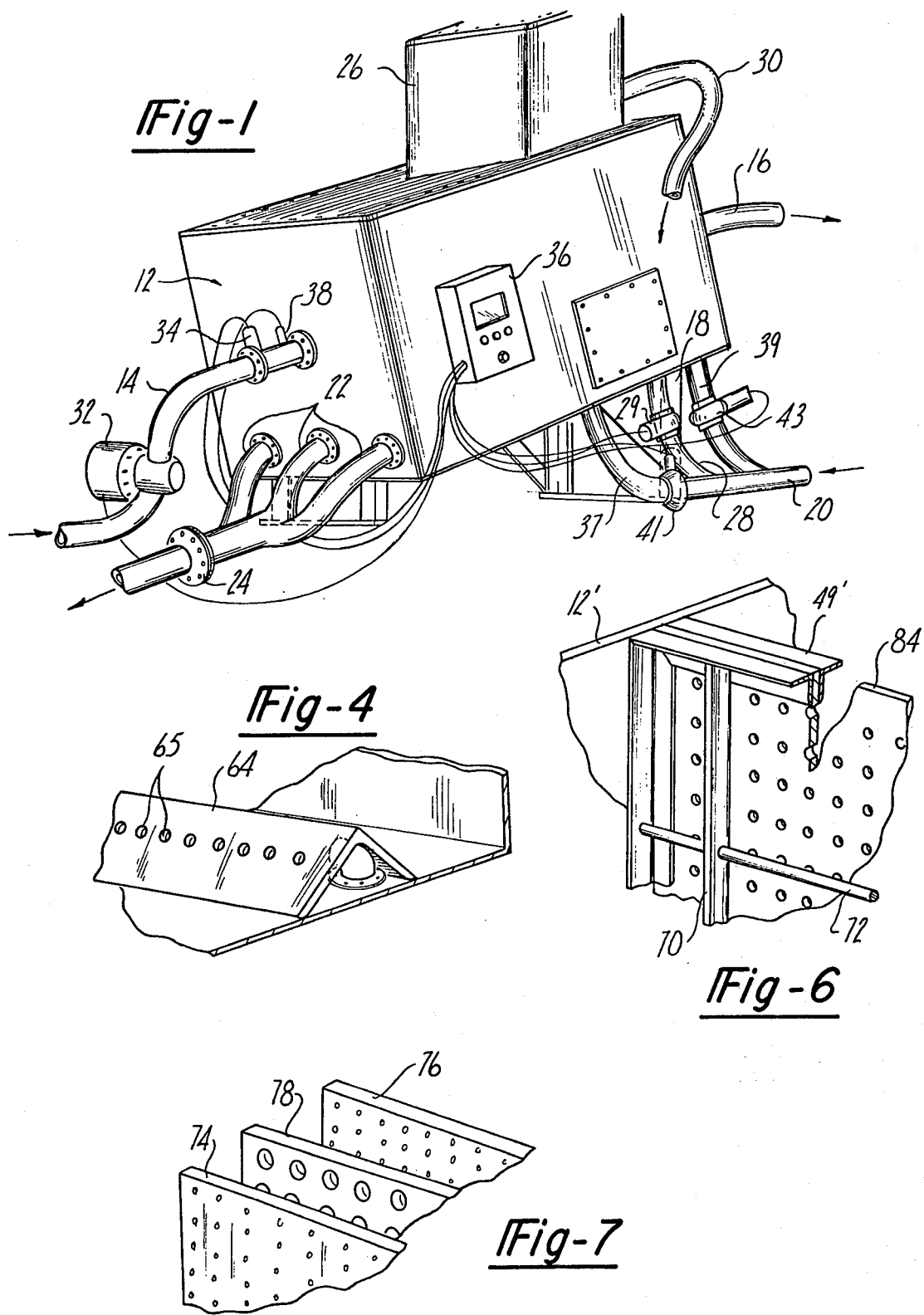
FIG. 1 is a perspective view of a water or wastewater filtration system incorporating the invention.

Referring to FIG. 1, a water or wastewater filtration system is shown to be comprised of a large rectangular steel tank 12 having a floor supported by I-beams 10 and defining a serial effluent filtering chamber and having an inlet pipe 14 entering through one end wall and an outlet pipe 16 extending through the laterally opposite end wall. The tank 12 is provided with support legs 18 at the outlet end so as to elevate the outlet end relative to the inlet end and incline the floor of the influent filtering chamber at an angle of approximately $22\frac{1}{2}°$ relative to horizontal. As hereinafter described with reference to FIG. 2, the chamber defined by tank 12 is subdivided into a series of parallel subchambers by perforated septa mounted in parallel within the tank, at least one of the subchambers being substantially filled with a particulate filtering medium such as sand thereby to filter and polish the influent entering the tank through inlet pipe 14. As will be apparent to those skilled in the art, the inlet pipe 14 is connected through a pump 32 and valve 34 to a supply of water or wastewater already having undergone some treatment operations. In the case of sewage or industrial waste, inlet 14 may be directly connected to a secondary wastewater treatment settling tank, however, it is preferable when possible, to have a substantial buffer reservoir such as a pond or lagoon between the secondary treatment and inlet 14 to avoid ingestion of excessive solids resulting from temporary upsets to the secondary treatment system.

To backwash the filtering medium or media within tank 12 a main backwashing supply 20 is connected to several points on and in the filtering chamber as hereinafter described. Supply 20 is also connected through a pump to a supply of water which is suitable for backwashing purposes. The backwash water is caused to flow in different directions within tank 12; part of the flow is counter to the normal effluent flow through the filtering chamber and is discharged therefrom by a group of spaced and manifolded backwash outlet pipes 22 which provide for large flow volumes and rates. Pipes 22, after being joined, flow through a solenoid controlled valve 24 to the point of disposal. The other part of the backwash flow is at right angles to the effluent flow and emerges from a pipe 30 in a raised steel bonnet 26 which forms part of tank 12.

Tank 12 is constructed such that bonnet 26 is placed over the subchambers within tank 12 which contain those fine filter media such a sand thus to provide expansion volume for the vertical backwashing. Vertical backwashing water is admitted into the bottom of the filtering subchamber by way of pipe 28 which may also be provided with a solenoid operated control valve 29. Vertical backwashing water is discharged from the top of the chamber through pipe 30 to the point of disposal.

The influent which is input to the tank 12 is pumped therethrough at suitable flow rates by motor pump combination 32. The inlet pipe 14 may be effectively sealed off by the solenoid control valve 34.

The horizontal backwash water may be admitted to tank 12 via pipe 37 to wash only coarse media as hereinafter described. Alternatively or additionally, backwash water may be admitted to the tank via pipe 39 to counterflow through the entire tank 12. Pipe 37 contains valve 41 and pipe 39 contains valve 43.

All of the pump motors and valves are connected to be controlled by a sequence programmer 36 which may be adjusted to establish the time periods between backwash operations, the length of the backwash cycle, as well as the various constituents of the overall cycle, and such other variables as may require control in a given operating system. The time between backwash operations may therefore be controlled by a clock so as to occur in a regular or periodic fashion. In addition, backwash initiation may be subject to an override by means of an inlet pressure sensor 38 which is mounted on pipe 14 as shown in FIG. 1. The sensor is set to a pressure threshold which, when reached, indicates that the filter media has developed a sufficient head los build-up to require backwashing to restore normal head losses.

Figure 2:
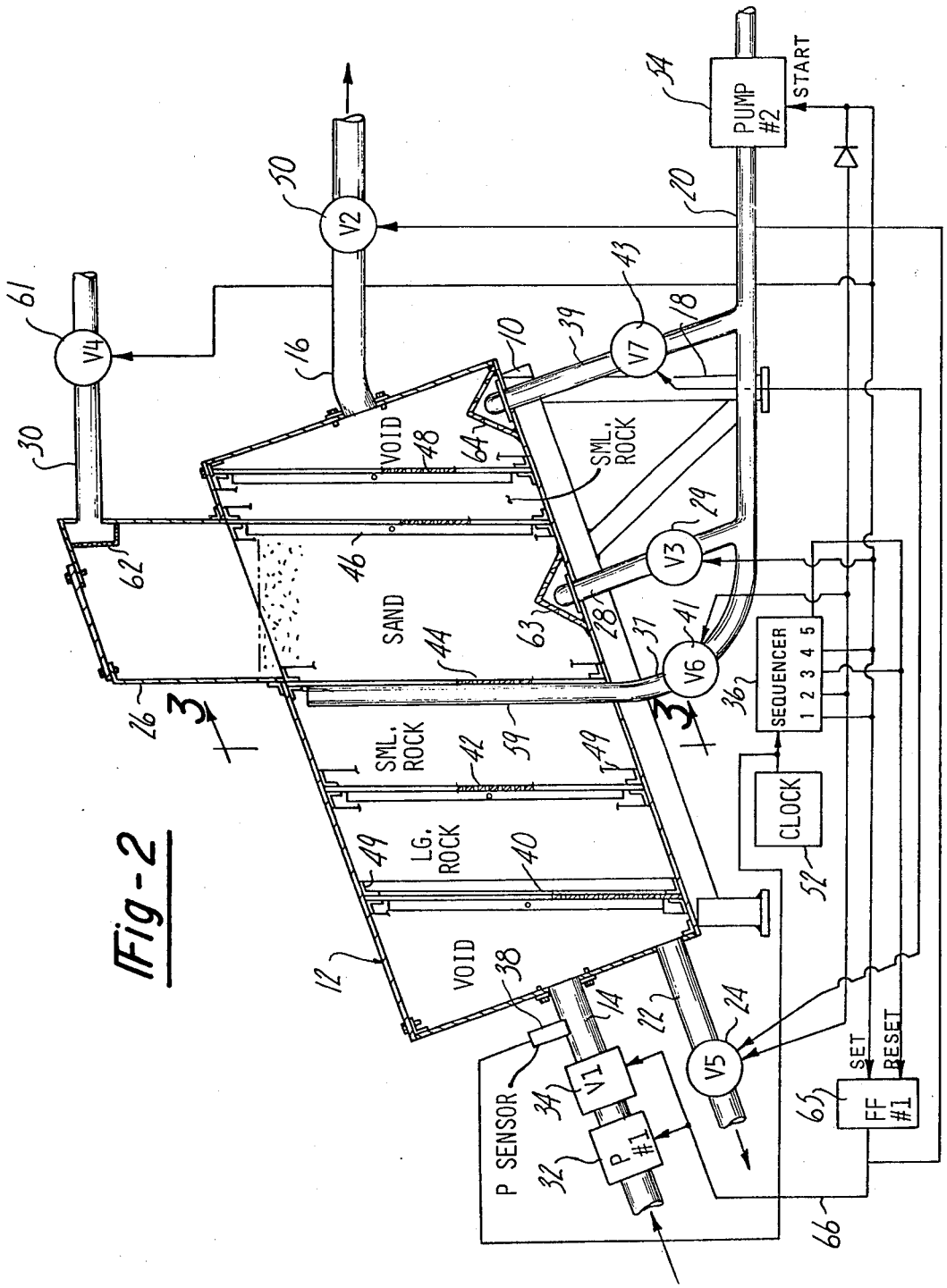
FIG. 2 is a side view, in section, of a system incorporating the invention and including a schematic circuit diagram of the programmer and control valves.

Referring now to FIG. 2, an illustrative system is shown in detail. As will be apparent from a comparison of FIGS. 1 and 2, like reference characters have been used to identify corresponding components.

Tank 12 is constructed of heavy sheet steel and for a system having a filtering flow rate capability of about 2500 to 7200 gallons per hour may be dimensioned approximately 7 feet in length by 4 feet in height by 6 feet in width. The bottom and side panels are flat quarter-inch steel plate. Tank 12 is tipped upwardly at the outlet end on legs 18 at an angle of about $22\frac{1}{2}°$. The interior of tank 12 is divided into six subchambers by a plurality of parallel perforate septa 40, 42, 44, 46 and 48, all of which are pre-formed to retain the desired size of media held within the tank 12. Each septa is suitably supported by retainer channels 49 welded to the top, bottom, and sides of the tank as will be apparent to those skilled in machinery construction. The septa span the full width and height of the tank 12 and are perforated with relatively evenly distributed openings to permit the passage of effluent and backwash water laterally therethrough. The septa are installed at an angle of $22\frac{1}{2}°$ from the vertical when the floor of the tank 12 is horizontal such that raising the outlet end of the tank rotates the planes of the septa to a vertical operation. It is to be understood that the illustration of five septa to produce six subchambers is by way of example only as other arrangements may be used to meet specific treatment requirements. This inherent flexibility in operating specification is one of the advantages of the subject invention.

The advantages of the vertical septa within the inclined tank 12 are several: First, the substantially vertical orientation of the septa, as well as any filtering media contained between the septa, takes much of the load off of the septa since the filtering media do not produce high lateral loadings proportionate to depth in the manner of fluids; secondly, the septa have greater height and surface area than septa extending perpendicular to floor and top in the same size tank and hence increase the rating of the system 10 for filtering action.

Various other advantages also accrue as will be hereinafter described.

The main filtering subchamber lies between septa 44 and 46 and is filled to a point above the intersection of the roof and bonnet 26 with sand of uniform particle size chosen to produce the desired quality of removal. The main filtering subchamber is approximately 2 feet in lateral dimension as seen in FIG. 2. The subchamber between septa 42 and 44 is about one foot in horizontal depth and is preferably filled with a small gravel having a uniform particle size up to approximately ⅛ inch. The subchamber between septa 40 and 42 is also about one foot in depth and may be filled with a larger gravel having a particle size of up to ¼ inch or more. The subchamber between the left end wall of the tank 12 as seen in FIG. 2 and septum 40 is void. The subchamber between septa 46 and 48 is also filled with a small rock of a uniform particle size of about 4-6 mm. This subchamber may be eliminated from many systems. The subchamber between septum 48 and the right end wall of tank 12 as seen in FIG. 2 is void.

The hole size in septa 40, 42 and 48 is small enough to retain the media. The hole size of the perforations in septa 44 and 46 may be 1/32 to about 3/32 inch or sufficiently small to retain the sand medium and spacing is such as to provide provide fifty or more holes per square inch.

Influent is pumped into and through tank 12 by inlet pump 32 when valve 34 is open. The effluent passes out through outlet pipe 16 and a valve 50 which must be opened along with valve 34. Pumping through the tank 12 continues for a time period set by a clock timer 52, or, until such time as an inlet pressure sensor 38 indicates that the filter media and septa have become clogged with accumulated suspended solids and inlet pressure exceeds a predetermined threshold value.

At this time valves 50 and 34 are closed by sequencer 36 and the backwashing operation begins. In the illustrated embodiment the backwashing operation is carried out in two main steps or phases, the first being a horizontal backwash of the coarse media, and the second being a vertical backwash of the sand between septa 44 and 46. The steps may be complemented from time to time with other steps as hereinafter described.

Figure 3:
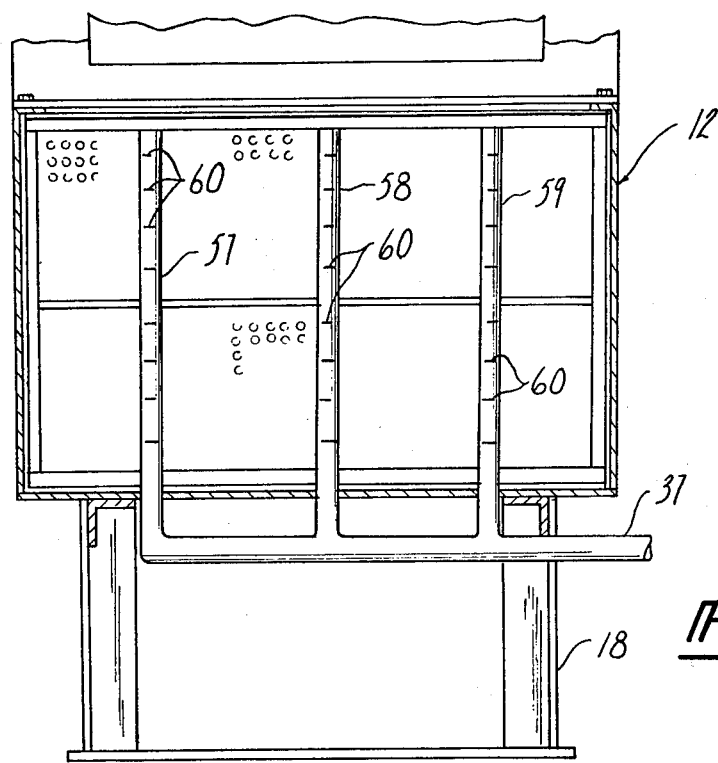
FIG. 3 is a sectional view through the tank of FIG. 2 showing detail of one of the septa.

The horizontal, counterflow backwash is effected by energizing backwash flow pump 54 and opening valves 41 and 24. Valve 41 permits backwash water to flow at high rates through a parallel group of pipes 57, 58 and 59 which, as shown in FIG. 3 are adjacent to septa 44 and spaced across the influent flow-path. All three pipes are fed by pipe 37. Slots 60 are provided at spaced intervals in the sides of pipes 57, 58 and 59 which face the septa 40 and 42 to emit wash water in the counterflow direction. A greater or lesser number of pipes may be employed; however, all pipes preferably span the full height of the tank 12. Pump 54 is driven by a proper sized motor to create adequate flow and head for the wash water. The result is a cleansing of the septa 40 and 42 and the media between septa 40, 42 and 42, 44.

The vertical backwash is accomplished by energizing pump 54 and opening valves 29 and 61 to permit backwash water to flow upwardly through the subchamber between septa 44 and 46, through screen 62 and pipe 30. The backwash effluent then flows to a point of disposal.

The vertical backwashing of sand or any similar fine particulate filtering medium tends to expand the medium vertically by, in some cases, as much as approximately 50% of the original settled depth of the medium. This expansion produces a vigorous scrubbing action which is effective to fully polish and clean the filtering medium particles. Backwashing, in two directions permits less expansion and less wash water for the required cleansing. Bonnet 26 provides for the necessary amount of expansion. The sand, when resettled, may vary somewhat in depth depending upon the extent of compaction and the resulting settling patterns. In any event, it is necessary to have sufficient sand in the fine filtering subchamber so that the settled depth never falls below the height of the tank-top on the left of the bonnet as seen in FIG. 2. Should this occur, the effluent might flow over the top of the sand and hence bypass the fine filtering action which is essential to effective treatment in the system 10. As can be seen, the slope of the tank permits considerable latitude in the sand depth without harm to the process.

The vertical backwashing phase may be accompanied by a degree of lateral backwashing caused by a partial opening of backwash outlet valve 24. This would permit some degree of horizontal flow of the backwash water through outlet pipe 22 during the vertical backwash of the fine filtering medium, the effect being not only the conservation of backwash water but the reduction of time required for the overall backwash operation.

Between the horizontal and vertical backwashing operations, it may be desirable to open valves 34 and 50 and energize pump 32 momentarily to cause effluent flow through septum 44 to clear collected waste. It is also desirable to maintain the capability for a full counterflow backwash through the entire series. For this reason pipe 39 and valve 43 are connected between supply line 20 and the void subchamber at the elevated end of tank 12.

A feature of the backwash system is shown in FIGS. 2 and 4 to comprise diffusers 63 and 64 placed laterally across the floor of tank 12 over the inlet ports of pipes 37 and 39. Diffuser 64, for example, is shown in FIG. 4 to have a series of holes 65 drilled or cut therein as one mechanism to distribute the backwash water evenly across the tank 12. Other devices may also be used. The diffuser system acts also to rigidify the floor of the tank.

The void space between the left end wall of tank 12 and the septum 40 acts as an accelerator to clear the wastefilled backwash water rapidly out through pipes 22 thus to prevent any deposition of large dirt particles as the water emerges from the coarse gravel between septa 40 and 42.

FIG. 2 also discloses a relatively simple and inexpensive solid-state control mechanism for the various valves and pumps to carry out the above described sequence. It will be understood that conventional relays may also be used. Clock 52 is essentially a source of periodic digital pulses and is connected to the input of a sequencer 36 which may be constructed using a commercially available pulse responsive counter such as a CD 4017 having a plurality of output terminals numbered 1 through 5 in FIG. 2. The CD 4017 has ten outputs, but only five need be used. The application of periodic clock signals to the input shifts the active condition through the register 36 from one end to the other, sequentially activating the output lines one at a time in a periodic or non-periodic fashion depending upon the selection of the various outputs to be utilized. It should be noted that clock 52 does not constitute the internal clock pulse source for the sequencer 36, that source being built into the sequencer unit and typically taking the form of a low frequency oscillator. Again many commercially available devices are known. Clock 52 is in the nature of a conventional time clock and produces a "start" signal every three or four hours, or whatever other time interval between backwash operations is determined to be necessary, to gate the internal clock pulses from the internal clock of the sequencer 12 into the shift register input. The pressure sensor 38 in the input line 14 is also connected to the "start" signal terminal of sequencer 36 so as to override the clock 52 in the event accumulated suspended solids produce a substantial pressure rise in the inlet pipe in advance of the normal backwash period.

The number 1 output of sequencer 36 is connected to the set input of a flip-flop 65. When flip-flop 65 is set, output line 66 goes high to shut off pump 32 and close valve 34. In addition, output line 66 is connected to close valve 50 to fully terminate the flow of effluent through the tank 12.

The next pulse from clock 52 makes the No. 2 output go high. The No. 2 output sequencer 36 is connected to open valves 24 and 29 and to set a flip-flop 66 to start pump 54. This enables the counterflow backwash through the gravel layers from septum 44 to the outlet pipes 22. This operation may continue for several clock times merely by spacing the outputs accordingly.

The No. 3 output of sequencer 36 resets flip-flop 65 to resume the effluent flow for a short time to clear septum 44. At the next clock time, output No. 4 goes high to again set flip-flop 65 to stop effluent flow. The No. 4 output is also connected to open valve 29 and 61 and to start backwash pump 54 to effect the vertical backwash. Output No. 5 simply resets the flip-flop 65 to restart the effluent flow. A convenient chart of operations is given in Table I below.

TABLE I

| Time | Function Enabled |
|---|---|
| T0 | P1 on |
|    | V1 V2 open |
| T1 | P1 off V1 V2 closed |
| T2 | P2 on |
|    | V5 V6 open |
| T3 | P1 on |
|    | V1 V2 open |
| T4 | P2 on |
|    | V3 V4 open |
| T5 | P1 on |
|    | V1 V2 open |

Figure 5:
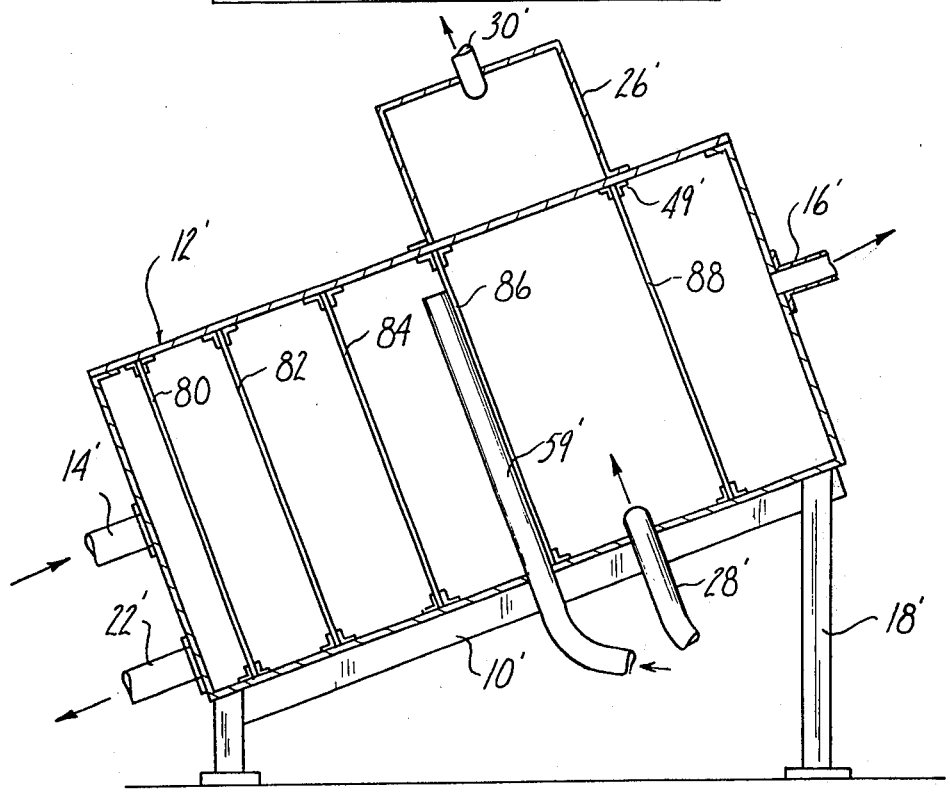
FIG. 5 is a side view in section of an alternative tank construction.

FIG. 5 is a simplified side view of a treatment tank 12' illustrating an alternative construction to that of FIG. 2. The principal differences between the tank 12' of FIG. 5 and the tank 12 of FIG. 2 involves the orientation of the septa and the number of internal subchambers defined by said septa. Because of the substantial similarity between the two embodiments, like reference characters are employed but the reference characters of FIG. 5 are given a "prime" for purposes of distinction.

Tank 12' is shown in FIG. 5 to be a substantially rectangular tank constructed of welded steel plate resting on a pair of I-beams 10' which in turn sit on legs 18' to incline the right ends of the tank, as seen in FIG. 5, at an angle of approximately 22½°. Effluent inlet 14' is provided at the left end and effluent outlet 16' is provided at the right end. Spaced parallel septa 80, 82, 84, 86, and 88 of perforate aluminum plate are held in place by angle iron retainers 49' to define five subchambers within the tank 12'. Starting at the left, the first subchamber is void; the second subchamber is filled with gravel on the order of ⅜ inch; the third subchamber is filled with gravel on the order of ¼ inch; the fourth subchamber is filled with fine gravel on the order of ⅛ inch; the fifth subchamber is filled with sand between 6 and 20 mesh and the right hand most subchamber is void. All subchambers are approximately 1 foot thick except for the sand chamber which is approximately 2 feet thick. The sand chamber is provided with extra height by means of a bonnet 26' which is bolted on to the top of the tank 12'. Tank 12' thus provides the advantages of reverse media grading wherein the influent passes through media varying from large to small particle sizes as previously described. In the embodiment of FIG. 5 the gravel performs a substantial amount of removal of suspended solids while the sand operates as a polishing medium.

Horizontal counterflow backwashing of the gravel may be provided by pipes 59' and an outlet 22' substantially identical to the structure shown in FIGS. 2 and 3 and described above. Horizontal flushing of the sand chamber may be provided by means 28' and 30' the counterparts of which have also been described in detail.

Because the septa in the embodiment of FIG. 5 are inclined at an angle of 22½° from vertical, additional loading due to the particulate media is caused. Therefore, it may be desirable to provide additional bracing for the septa in the embodiment of FIG. 5. FIG. 6 illustrates one approach to such additional bracing. Conventional angle iron braces 49' are welded in mirror image pairs about the sides and bottom of the tank, while the top of the tank is yet to be installed. The angle braces 49' are spaced apart to form a slot into which the septum 84 is dropped. Vertical braces 70 may be welded between the top and bottom angle irons 49' and supplemented with horizontal rods 72. The number of braces and rods 70 and 72 respectively which are required in any given structure may vary according to the thickness and structural strength of the septum.

FIG. 7 shows an alternative or supplemental approach to septum construction wherein initially separate plates 74, 76 and 78 are welded together to form a laminated unit. Plates 74 and 76 are provided with very small holes to contain the fine media on at least one side of the laminate while central plate 78 is punched with very large holes to provide stiffness without increased hydraulic resistance. Where two or three such plates are tacked and welded together it will be understood that the slot or spacing between the angle iron braces 49' must be increased correspondingly. While the embodiment of FIGS. 5 and 6 does not eliminate as much of the loading on the septa as does the embodiment of FIG. 2, only small loadings are imposed and the construction has the further advantage of allowing the use of conventional 90° angle iron 49' for the construction of the septum braces.

It is to be understood that various changes and modifications to the invention as illustrated and described are possible and further that the foregoing description is illustrative in nature and is not to be construed in a limiting sense.

The embodiments of the invention in which an exclusive property or privilege is claimed are defined as follows:

1. A waste effluent tratment system comprising: means defining a closed chamber having an inlet at one end and an outlet at another laterally opposite end; a plurality of perforate septa substantially vertically disposed in spaced relation within said chamber between the inlet and outlet to divide same into subchambers through which an effluent flow path extends; a particulate filtering medium in at least one of said subchambers; backwash means for directing a backwash flow reversely to said effluent flow through at least one of said subchambers and, additional backwashing means for backwashing said medium at right angles to the flow path.

2. Apparatus as defined in claim 1 wherein the outlet end is elevated relative to the inlet end such that the flow path therebetween is inclined relative to the horizontal.

3. Apparatus as defined in claim 2 wherein said chamber is inclined corresponding to said inclination of said outlet end and inlet end and wherein said septa are disposed within the chamber so as to be fully vertical only when the chamber is inclined.

4. Apparatus as defined in claim 1 wherein said septa are plates of non-corrosive sheet metal perforated with spaced holes.

5. Apparatus as defined in claim 1 wherein said backwashing means comprises a first backwash inlet at the outlet end of the chamber and a first backwash outlet at the inlet end of the chamber, 1st valve means for connecting the first backwash inlet to a source of backwashing water, and second valve means for selectively controlling flow conditions through said backwash outlet; said first backwash inlet and outlet being effective to produce a flow of backwash water which is counter to the flow of effluent thereby to cleanse said septa and media of accumulated waste material.

6. Apparatus as defined in claim 5 wherein said additional backwashing means further comprises a second backwash inlet adjacent the bottom of said one subchamber, and third valve means for selectively causing backwash water to enter said second inlet and to flow vertically therethrough to cleanse the filtering medium in said subchamber.

7. Apparatus as defined in claim 6 wherein said chamber is constructed such that the vertical height of the one subchamber containing the medium is substantially greater than the height of the medium in said subchamber thereby to allow vertical expansion of the medium during vertical backwashing.

8. Apparatus as defined in claim 7 said additional backwashing means further including a second backwash outlet adjacent the top of said one subchamber, and fourth valve means in said second outlet to control flow therethrough.

9. Apparatus as defined in claim 8 including automatic programmer means connected to said first and third valve means for sequentially operating the vertical backwash and counter flow backwash.

10. Apparatus as defined in claim 9 wherein the programmer means includes means to partially open the second valve means during the vertical backwash to produce a component of counterflow during the vertical backwash.

11. Apparatus as defined in claim 1 wherein the particulate media in said one subchamber is sand having a particle size in the range between 0.8 mm and 3.5 mm, the next adjacent subchamber toward said effluent inlet containing a second filtering medium having a particle size greater than said range thereby to provide serial, reverse-graded filtering action in said chamber for effluent flow.

12. A waste effluent treatment system comprising: a closed tank having an effluent inlet at one end and an effluent outlet at an opposite end to provide an effluent flow path substantially horizontally through the tank; a plurality of septa disposed in spaced relation within the tank to subdivide the tank into subchambers serially along the effluent flow path; a fine particulate medium in at least one of the subchambers to filter the effluent; a coarse particulate medium in another subchamber and upstream in the effluent flow from said one subchamber; first means for horizontally backwashing at least the coarse medium; and second means for vertically backwashing and expanding the fine medium in said one subchamber.

13. A waste treatment system as defined in claim 12 wherein the tank is constructed such that the vertical dimension of said one subchamber is greater than that of the remaining chambers of the tank thereby to permit vertical expansion of the fine medium during vertical backwashing.

14. A waste treatment system as defined in claim 13 including means for elevating the effluent outlet end of the tank at an angle less than about 45° relative to horizontal.

15. A waste treatment system as defined in claim 14 wherein the septa are angularly disposed within the tank relative to the tank floor but parallel to one another so as to be oriented substantially vertically only when the tank is elevated as aforesaid.

16. A waste treatment system as defined in claim 12 wherein the first means for backwashing comprises backwash water conduit means disposed within said tank between the coarse and fine media for introducing water to the tank and having outlets formed therein for flushing the coarse media.

* * * * *

Notice of Adverse Decision in Interference

In Interference No. 100,414, involving Patent No. 4,051,032, J. A. Borchardt, WATER TREATMENT SYSTEM, final judgment adverse to the patentee was rendered Jan. 6, 1982, as to claims 8 & 16.

[*Official Gazette April 6, 1982.*]